July 23, 1968  L. H. A. KING  3,394,242

ELECTRICAL ARC CONTROL

Filed July 27, 1964  3 Sheets-Sheet 1

Inventor
Leslie H. A. King
By Kenon Palmer
Stewart & Escabrook
Attorneys

July 23, 1968 L. H. A. KING 3,394,242
ELECTRICAL ARC CONTROL

Filed July 27, 1964 3 Sheets-Sheet 2

Inventor
Leslie H. A. King
By Kenon Kemer
Stewart & Estabrook
Attorneys

July 23, 1968   L. H. A. KING   3,394,242
ELECTRICAL ARC CONTROL
Filed July 27, 1964   3 Sheets-Sheet 3
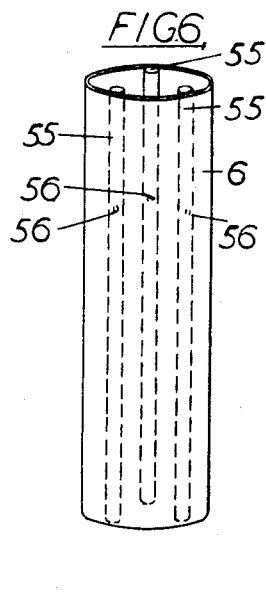
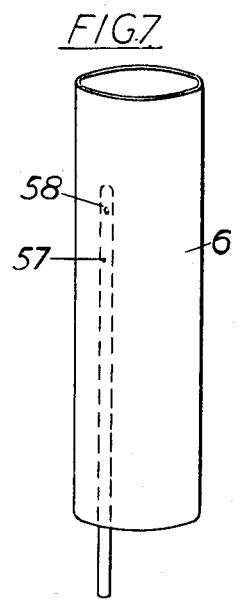
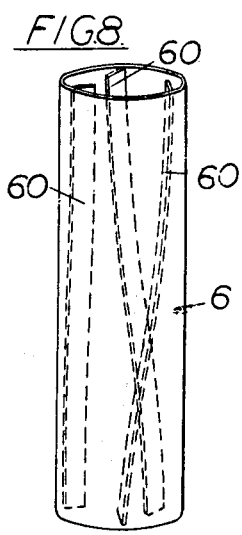
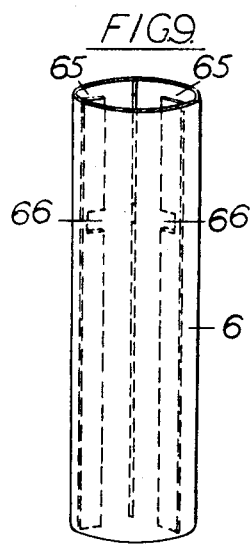
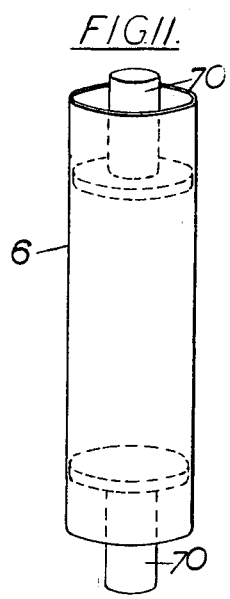
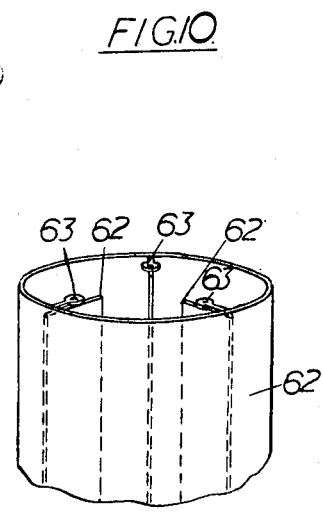
Inventor
Leslie H. A. King
By Kenyon, Palmer
Stewart & Estabrook
Attorneys

3,394,242
ELECTRICAL ARC CONTROL
Leslie Herbert Andrew King, Leatherhead, England, assignor, by mesne assignments, to National Research Development Corporation, London, England, a corporation of Great Britain
Filed July 27, 1964, Ser. No. 385,268
Claims priority, application Great Britain, Aug. 7, 1963, 31,209/63
15 Claims. (Cl. 219—121)

ABSTRACT OF THE DISCLOSURE

A method and apparatus for heating flowable materials such as gases and/or solid particles in an arc plasma, the temperature of which is accurately controlled by rotating a tubular column of gas within a gas tight container and in which the arc takes place around the longitudinal axis of the arc at a substantially constant angular velocity and with a minimum of axial flow of the gas. A first and second electrode are mounted inside said gas tight container along said longitudinal axis. Impeller vanes are mounted within the gas tight container so as to induce a slight axial movement of the gas in addition to the necessary rotary movement.

---

The gas vortex method of stabilising arc columns has been known for many years. In particular if the arc is horizontal the effect of the vortex is to counteract the upward bowing which would otherwise take place owing to convection effects. The characteristic gas flow associated with such a vortex, that is to say, the variable angular velocity associated with the appreciable axial flow, has the effect of constricting the arc and consequently of raising its temperature. This same effect is utilised in the projection of plasma jets in which very high temperatures are produced over small areas. Such jets may be used for a variety of heating purposes but the heating effect obtained is not subject to very close control.

As an alternative to the formation of a gas vortex round an arc, gas may be caused to rotate in the form of a cylindrical body, that is to say, with substantially constant angular velocity and without appreciable axial flow. We have found that, under these conditions, not only is the diameter of the arc substantially increased but also the potential gradient along the arc is substantially reduced. This invention is based on the realisation that such an arc provides an increased volume at a more closely controlled high temperature in which substances may be heated and gaseous reactions may be carried out. Thus according to the invention the material to be heated is passed through an electric arc extending along the axis of a tubular enclosure and enveloped within a body of gas rotating without appreciable axial flow at an angular velocity which is substantially constant through the body and is sufficient to produce an increase in the diameter of the arc in relation to that in stationary gas. To produce the necessary rotation of the gas the enclosure itself may be caused to rotate in which case the best results are obtained by fitting the inner wall of the enclosure with impeller vanes.

It is found that the relatively large volume of heating space available in combination with the fact that the characteristics of the arc, wheher supplied by direct current or alternating current, are readily controllable, leads to consistent and uniform heating effects giving results which cannot be obtained in other ways. If the material to be heated is in the form of solid particles the arc is arranged substantially vertically and the particles are allowed to fall through the length of the arc. If in addition it is desirable to spheroidise them they may be allowed to fall a further distance below the bottom of the arc so as to cool before arriving at the collector. If the material to be heated is in the form of a gas it may be fed to an intermediate point in the arc path by means of a hollow probe extending long the enclosure.

It will be appreciated from the foregoing that the use of an arc in this way for heating purposes provides a form of furnace which may be used for specialised heating effects. Such a furnace is particularly suitable for use with particles of refractory solid material which it is desired to heat or melt. The time and temperature of the heating may be adjusted very readily by control of the length of the arc (which controls the time of heating) and also by control of the temperature which varies with the diameter and the distance from the centre of the arc at which the particles are introduced. The temperature of the enclosure as a whole can be varied by adjusting the power input per unit length of arc or by controlling the pressure within the chamber or both. As mentioned previously it is important to reduce the axial convective flow of gas at the arc column to a very small value and the centrifugal forces due to rotational motion of the gas tend to affect the gravitational force in determining the actual flow pattern. In addition to its use with particles to be heated, the arrangement just described may also be used for the gasification of high boiling point materials. These may be introduced as powders at the top of the chamber as already described.

Another application is to the production of artificial gems, such as ruby, by recrystallisation at high temperature in controlled atmospheres. Clean conditions can readily be obtained.

As mentioned above the furnace may be used for the heating of gases and in this case the arc may be either vertical or horizontal. The same conditions of arc control will still apply and the gases and other substances with which they may be required to react must be fed to the arc region in such a way as to keep down the axial flow. In this way it is possible to bring about chemical syntheses such as the formation of boron nitride or the formation of acetylene from hydrogen and coal dust. Alternatively chemical decomposition may be affected such as the cracking of heavy hydrocarbons.

Although it is possible to obtain the necessary motion of the gas merely by rotating the enclosure, the use of impeller vanes gives greatly improved results. Accordingly, apparatus in accordance with the invention for carrying out the general method just described comprises a rotary tubular enclosure fitted with internal impeller vanes, a drive for the enclosure or the vanes or both and electrodes capable of axial adjustment within the enclosure, between which an electric arc may be established. Preferably the impeller vanes are mounted on the inner wall of the enclosure so that both turn together. The vanes may be made adjustable so as to vary the operating conditions. For example, the impellers may be capable of adjustment radially or axially and may be shaped so as to control the axial flow of gas. In addition, by varying the cross section of the impeller vanes, they may vary in diameter along the length of the enclosure so as to produce a corresponding variation in the diameter of the arc. This in its turn leads to variation in the temperature of the arc which may be required for specialised effects.

The tubular enclosure needs to be driven at high speeds and generally speaking, particularly when heating solid particles, requires to be filled with an inert gas so that it is necessary to seal the interior of the enclosure from the atmosphere. Accordingly the apparatus preferably includes a gas-tight outer container within which the rotary tubular enclosure is mounted, and the drive for the enclosure passes through a gland in the wall of the outer container. This avoids the requirement for making any seal between the ends of the rotary enclosure and the electrodes which are, of course, stationary during operation.

Apparatus in accordance with the invention will now be described in more detail with reference to the accompanying drawings in which:

FIGURES 6 and 7 illustrate the provision of adjustable hollow probes within the rotary enclosure;

FIGURES 8, 9 and 10 illustrate details of impeller vanes; and

FIGURE 11 illustrates means for adjusting the effective length of the rotary enclosure.

Figure 1:
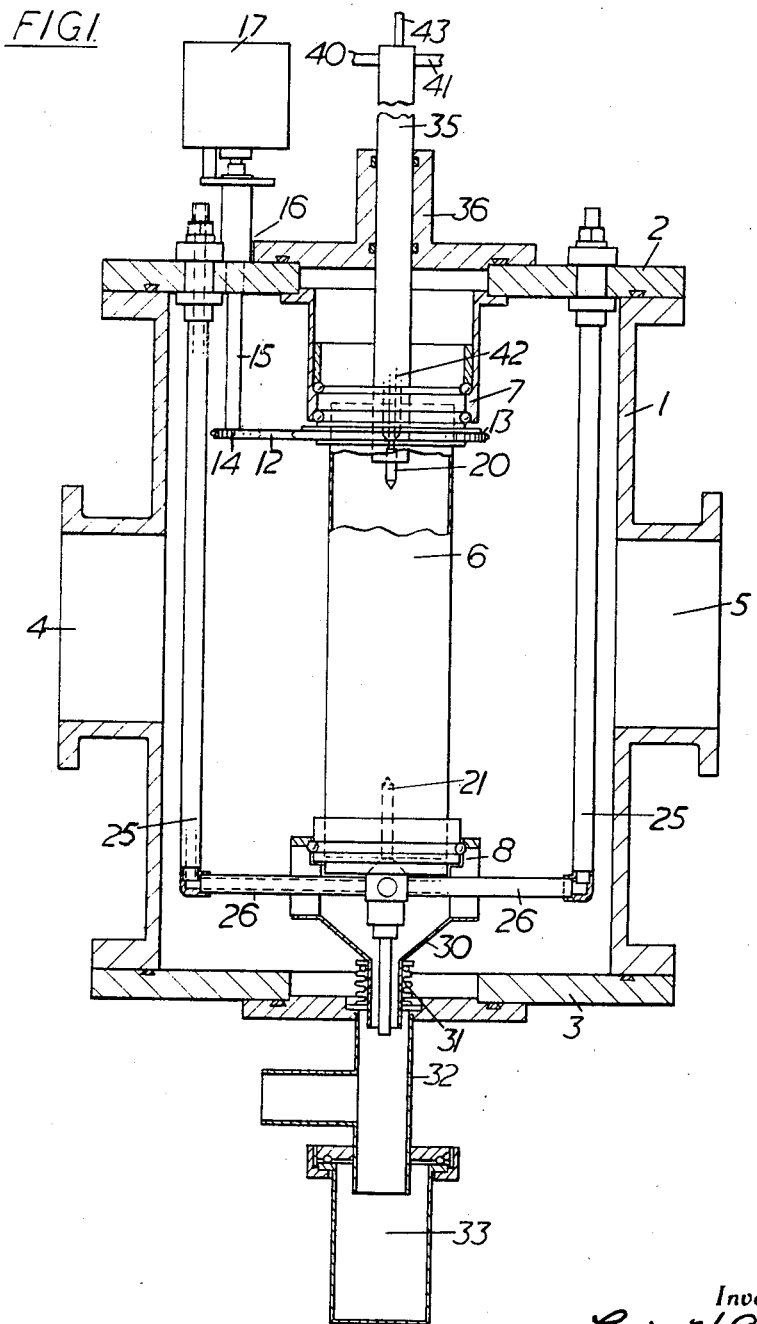
FIGURE 1 is a sectional elevation of the apparatus as a whole.

Turning first to FIGURE 1 the apparatus comprises essentially an outer gas-tight container 1 which is of generally cylindrical form and is fitted with upper and lower end plates 2 and 3. It is also formed with window openings 4 and 5 so that the operation can be observed from without. A rotary tubular enclosure 6 is formed of heat-withstanding transparent material such as quartz and is mounted to turn in upper and lower bearings 7 and 8 respectively. If it is not necessary to observe the operation within the enclosure 6 it may be made of metal which then requires to be cooled during operation. The enclosure 6 is driven by a chain 12 engaging a chain wheel 13 which encircles the upper end of the enclosure and which in its turn is driven by a sprocket 14. This is mounted on the end of a shaft 15 passing through a gland indicated generally as 16 in the end plate 2, being driven by an electric motor 17.

The provision of the outer container 1 avoids the need for any seal between the enclosure ends and electrodes shown as 20 and 21. Accordingly the enclosure 6 is open-ended and the only seal which is necessary is that provided by the gland 16 which may be of a standrd type. Accordingly it is possible for the enclosure 6 to be driven at high speeds without difficulty. To facilitate the removal of the enclosure 6 and the associated equipment from the container 1 the whole of this equipment is suspended from the upper end plate 2 by means of four rods, two of which are seen at 25, that running along the axis of the assembly being omitted for simplicity. The rods 25 support the lower electrode 21 by means of a spider consisting of four radial members 26, both these and the rods 25 being of conducting material so as to carry the current to the electrode 21. In addition these parts may be made hollow as indicated by the dotted lines so as to convey coolant to the electrode if necessary. The radial members 26 also support the lower bearing 8 for the enclosure 6.

Beneath the bearing 8 is mounted a collector funnel 30 supported from the lower end plate 3 by means of a bellows 31 and the funnel 30 leads to a passageway 32 which in its turn leads to a removable collector 33, for particles dropped vertically through the path of the arc.

Figure 3:
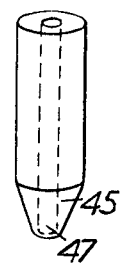

The upper electrode 20 is mounted in a holder 35 which is shown broken away in the drawing since it needs to be of sufficient length to enable the electrode 20 to be lowered into contact with the electrode 21 for the initial striking of the arc. After the arc has been struck the electrode 20 is raised to the position shown or such other position as may be required. The holder 35 is capable of sliding movement within a support 36 secured to the end plate 2. The holder 35 is formed with connections 40 and 41 for cooling water for the electrode 20 when necessary. The pipes down the body of the holder are not illustrated but are indicated by the dotted lines at 42. In addition the holder 35 includes a feeder tube 43 down which particles to be heated may be supplied to the electrode 20. As shown the electrode 20 is solid but a hollow electrode suitable for the feeding of particles is illustrated in FIGURE 3.

Figure 2:
FIGURES 2, 3, 4 and 5 are views to an enlarged scale of alternative constructions of electrode.

FIGURE 2 shows the basic construction of electrode having a conical end 45 coming to a blunt point 46. Various shapings of the end of the electrode are possible. In FIGURE 3 the electrode again has a conical end 45 but is formed with a central bore 47 connecting with the feeder passage 43.

Figure 4:

FIGURE 4 shows a quite different shape of electrode intended for use with an arc of particularly large cross-section. The increased cross-section of the arc leads to a corresponding reduction in its temperature and also a reduction in the temperature of the electrodes. Under these circumstances the electrode temperature may not be sufficiently high to maintain the arc and the electrode shown as 50 may require to include a separate heating coil for this purpose.

Figure 5:
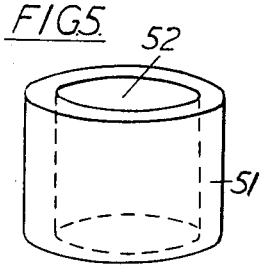

The electrode shown in FIGURE 5 as 51 is for use under similar circumstances as for FIGURE 4 but in addition the electrode is formed with a central opening 52 down which particles may be fed. Again an electrode of this configuration may require to be provided with an internal heating element. Use of electrodes such as shown in FIGURES 4 and 5 greatly extends the range of current over which the apparatus may be operated, especially the lower current values, so as to include processes that require temperatures below 5000° C.

FIGURES 6 and 7 show arrangements of hollow probes by means of which gases may be fed to and removed from the arc region. As shown in FIGURE 6, three tubes 55 are secured to the interior of the enclosure 6 so as to rotate with it. These tubes are double-walled (not shown in the drawings) to allow for water cooling and are formed with ports 56 by means of which gas may be fed to or withdrawn from the arc region. Although the ports are shown at substantially the same level it will in most cases be necessary to supply the gas at one point in the arc path and to withdraw it at another. Since the tubes rotate with the enclosure 6 the gas needs to be supplied to them by means of a manifold arrangement (not shown).

FIGURE 7 shows a single similar probe constituted by a tube 57 formed with a port 58 close to its end. This tube is water-cooled in the same way as the tubes 55 and is capable of both axial and radial adjustment. It does not rotate with the enclosure 6 which may be provided with impeller vanes although these are not shown in the drawing.

Arrangements of impeller vanes are, however, shown in FIGURES 8, 9 and 10. In FIGURE 8 the impeller vanes are shown as 60 and follow a somewhat helical path so as to induce a slight axial movement of the gas in addition to the necessary rotary movement. Depending on the conditions required for a particular process so the axial and rotary velocities may need to be adjusted and for this purpose the impeller vanes are adjustable for pitch and also adjustable radially and axially. The adjustment of pitch is illustrated in more detail in FIGURE 10 where impeller vanes shown as 62 are mounted at the ends of the enclosure 6 by means of supports 63 about which they may be turned to adjust the angle of pitch. As illustrated these vanes extend axially and do not have any helical shaping.

Vanes similar to those in FIGURE 10 are shown in FIGURE 9 as 65. These vanes have a cross-section which varies along their length, being cut away at 66. The effect of this cut-away portion is to permit local enlargement of the diameter of the arc with a consequent reduction in temperature. The vanes 65 are adjustable in an axial direction so that cut-away portions may be located where required and in addition the vanes may be replaced by others having different shapes and different numbers of cut-away portions.

Quite apart from the adjustment of the vanes it may sometimes be necessary to adjust the effective length of the enclosure 6. For this purpose adjustable piston members 70 are fitted at either end, the electrodes extending through the centres of these two members.

In order to obtain the necessary increase in the diameter of the arc relatively high rotary speeds are necessary. Thus if the enclosure 6 has a free section of 12 square centimetres it is found that it has to be driven at a speed in the region of 200 r.p.m. in order to stabilise the arc without appreciable increase in diameter, whereas effective expansion of the diameter to occupy a significant fraction of the free section requires a speed in the region of 500 r.p.m.

As a particular example of the effect which can be obtained in accordance with the invention an arc was established in the aforementioned enclosure in an atmosphere of nitrogen with a rotary speed of 500 r.p.m., an arc length of approximately 20 cm. and a current of 10 amperes. The potential gradient was found to be about 8 volts per centimetre as against 20 volts per centimetre for the free burning case, and the arc diameter was approximately 4 cm. with an axial temperature of 5500° K. The combination of a length of 20 cm. and a diameter of 4 cm. gave an appreciable region of high temperature which was used to produce 150 micron diameter spheroids of zirconium diboride whose melting point is 3750° K.

I claim:
1. Apparatus for heating flowable material comprising:
   a tubular enclosure having a vertical longitudinal axis;
   impeller vanes mounted within said enclosure;
   means for rotating said impeller vanes about said axis;
   upper and lower electrodes mounted substantially along said axis;
   inlet means for feeding said material to the interior of said enclosure while said impeller vanes are rotating; and
   outlet means for withdrawing said material from said enclosure while said impeller vanes are rotating.
2. Apparatus for heating flowable material comprising:
   a gas-tight container;
   a tubular enclosure within said container; said enclosure having a longitudinal axis;
   means mounting said enclosure for rotation about said axis;
   drive means for rotating said enclosure about said axis;
   first and second electrodes mounted to define an arcing region extending along said axis; and
   means for introducing flowable material to said arcing region and for withdrawing said material from said region.
3. Apparatus according to claim 2, in which said drive means is located outside said container and including a gland in said container and a driving connection extending through said gland to connect said drive means to said enclosure.
4. Apparatus according to claim 1, in which said impeller vanes are mounted on the inner wall of the enclosure so that both turn together.
5. Apparatus according to claim 4, in which said impeller vanes are adjustable.
6. Apparatus according to claim 1, in which the cross-section of said impeller vanes varies along the length of said tubular enclosure.
7. Apparatus according to claim 1, in which said upper electrode is hollow to permit particles to be dropped down the path of the arc.
8. Apparatus according to claim 1 including means for controlling the operating temperature of at least one of said electrodes.
9. Apparatus according to claim 1 including at least one hollow probe adjustably extending into said tubular enclosure, whereby gas can be introduced to or removed from any required position along the length of the arc.
10. Apparatus according to claim 1 and including means for varying the effective length of said tubular enclosure.
11. A method of heating flowable material, the steps comprising:
    rotating a cylindrical body of gas with substantially constant angular velocity and without appreciable axial flow, said body having a longitudinal axis;
    establishing an electric arc along said axis whereby the diameter of said arc is increased and the temperature of said arc is reduced in relation to the values in stationary gas;
    feeding said flowable material to said increased diameter arc;
    and collecting said material after heating.
12. A method according to claim 11 and including the steps of enclosing said body of gas within a tubular enclosure and rotating said enclosure.
13. A method according to claim 11 for heating solid particles, in which the arc is substantially vertical and the particles are allowed to fall by gravity through the length of the arc.
14. A method according to claim 13, in which the particles are spheroidised by falling a further distance below the bottom of the arc.
15. A method according to claim 11 for heating gases in which the gas is fed to an intermediate point in the arc path.

References Cited
UNITED STATES PATENTS

| | | | |
|---|---|---|---|
| Re. 25,958 | 2/1966 | Beasley et al. | 219—121 |
| 1,310,079 | 7/1919 | Hechenbleikner | 13—9 |
| 1,687,925 | 10/1928 | Briggs | 13—10 |
| 1,697,259 | 1/1929 | Briggs | 13—10 |
| 1,896,789 | 2/1933 | Scott | 13—9 |
| 2,943,182 | 6/1960 | Prout et al. | 219—121 |
| 3,118,046 | 1/1964 | Harrington | 219—75 |
| 3,147,330 | 9/1964 | Gage | 219—121 |
| 3,194,941 | 7/1966 | Baird | 313—231 |

FOREIGN PATENTS

| | | |
|---|---|---|
| 821,836 | 10/1959 | Great Britain. |

RICHARD M. WOOD, *Primary Examiner.*

W. D. BROOKS, *Assistant Examiner.*